US008804280B2

(12) United States Patent
Lopusnik et al.

(10) Patent No.: US 8,804,280 B2
(45) Date of Patent: Aug. 12, 2014

(54) ACTIVELY SYNCHRONIZING MAGNETIC RESPONSES OF A SHIELD AND A WRITE POLE

(75) Inventors: Radek Lopusnik, Bloomington, MN (US); Mourad Benakli, Bloomington, MN (US); Kirill Aleksandrovich Rivkin, Edina, MN (US); Declan Macken, Prior Lake, MN (US); James Gary Wessel, Savage, MN (US); Jason Bryce Gadbois, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 53 days.

(21) Appl. No.: 13/365,942

(22) Filed: Feb. 3, 2012

(65) Prior Publication Data

US 2013/0201577 A1  Aug. 8, 2013

(51) Int. Cl.
*G11B 5/127* (2006.01)

(52) U.S. Cl.
USPC ........................................................ 360/110

(58) Field of Classification Search
USPC .................... 360/110, 234.3, 235.4, 125.4
See application file for complete search history.

(56) References Cited

U.S. PATENT DOCUMENTS

| 7,099,121 | B2 * | 8/2006 | Parker et al. .................. 360/317 |
| 7,149,055 | B2 | 12/2006 | Clinton et al. |
| 7,212,367 | B2 | 5/2007 | Clinton et al. |
| 7,362,530 | B2 * | 4/2008 | Hashizume ..................... 360/67 |
| 7,372,665 | B1 * | 5/2008 | Stoev et al. .............. 360/125.33 |
| 7,679,863 | B2 * | 3/2010 | Hashimoto et al. ........ 360/235.7 |
| 7,808,746 | B2 * | 10/2010 | Burbank et al. ............ 360/294.3 |
| 7,862,912 | B2 * | 1/2011 | Hellwig et al. ............ 428/828.1 |
| 7,869,309 | B2 | 1/2011 | Mihalcea et al. |
| 8,077,417 | B2 | 12/2011 | Mallary et al. |
| 8,107,180 | B2 * | 1/2012 | Nishida et al. ................... 360/51 |
| 8,289,821 | B1 * | 10/2012 | Huber ....................... 369/30.03 |
| 8,547,659 | B1 | 10/2013 | Bai et al. |
| 2004/0169950 | A1 | 9/2004 | Clinton et al. |
| 2005/0280935 | A1 | 12/2005 | Clinton et al. |
| 2005/0289577 | A1 | 12/2005 | Seigler et al. |
| 2006/0132971 | A1 | 6/2006 | Clinton et al. |
| 2007/0036040 | A1 | 2/2007 | Mihalcea et al. |
| 2008/0112087 | A1 | 5/2008 | Clinton et al. |
| 2009/0158305 | A1 | 6/2009 | Seigler et al. |
| 2009/0226762 | A1 * | 9/2009 | Hellwig et al. ............... 428/815 |
| 2009/0237837 | A1 | 9/2009 | Amin et al. |
| 2010/0149675 | A1 | 6/2010 | Mallary et al. |
| 2011/0030109 | A1 * | 2/2011 | Saito ................................ 850/5 |
| 2011/0242694 | A1 | 10/2011 | Taguchi |
| 2012/0051196 | A1 * | 3/2012 | Grobis et al. .............. 369/13.24 |
| 2012/0314325 | A1 * | 12/2012 | Wessel et al. ............ 360/125.01 |
| 2012/0327529 | A1 * | 12/2012 | Hutchinson et al. ............ 360/31 |

* cited by examiner

*Primary Examiner* — Allen T Cao
(74) *Attorney, Agent, or Firm* — Hollingsworth Davis, LLC

(57) ABSTRACT

In an example, a method of manufacturing a transducer head comprises configuring a control circuit to actively synchronize magnetic responses of a shield and a write pole during operation. The method also comprises configuring the control circuit to energize at least one coil wire during operation with a current direction opposite to current flow in a main transducer head coil. In another example, a method comprises actively synchronizing magnetic responses of a shield and a write pole. In another example, a transducer head comprises a write pole and a shield, and a control circuit actively synchronizes magnetic responses of the shield and the write pole.

20 Claims, 7 Drawing Sheets

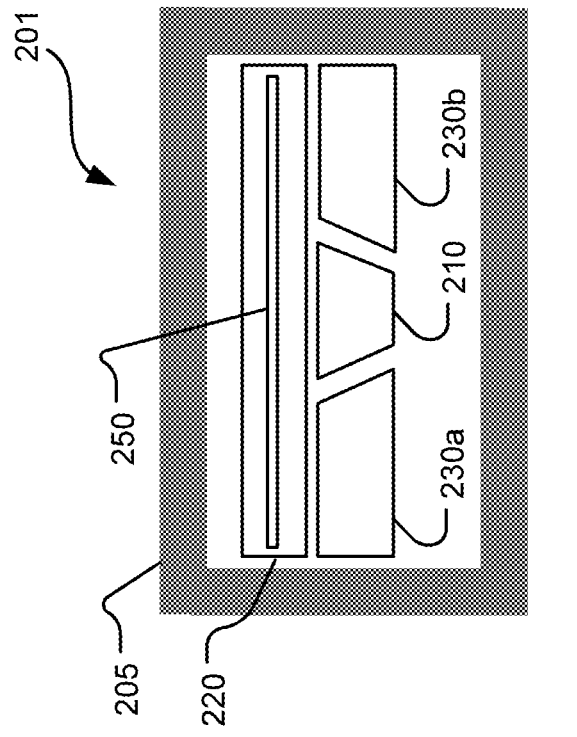
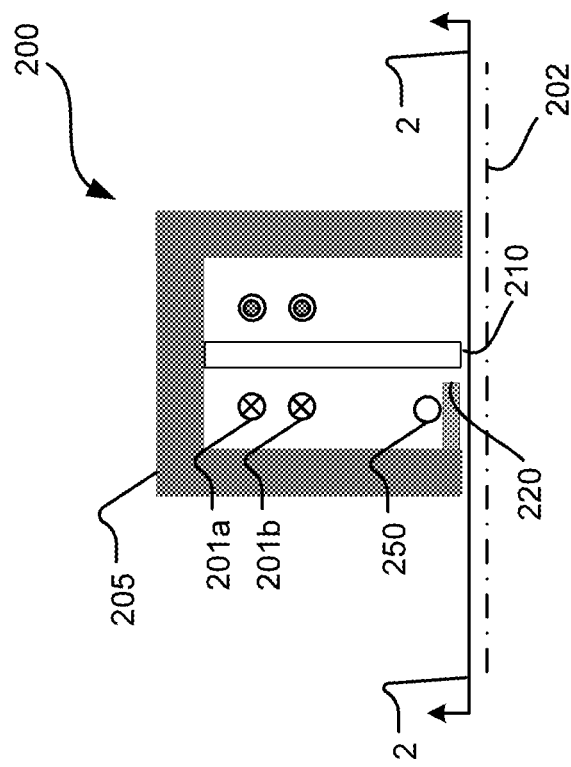
FIG. 2b
FIG. 2a

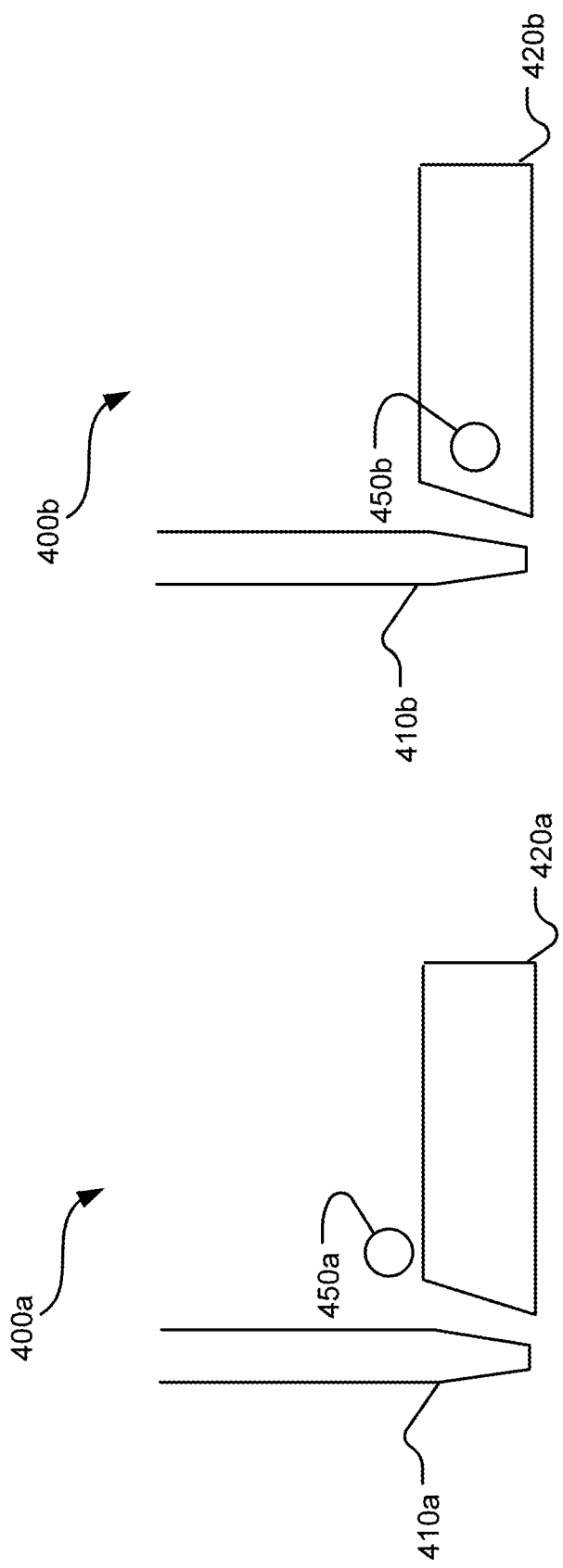

ACTIVELY SYNCHRONIZING MAGNETIC RESPONSES OF A SHIELD AND A WRITE POLE

BACKGROUND

To ensure that the transducer write head accurately magnetizes the appropriate magnetic cells on magnetic media during write operations, the cells on the media are positioned beneath the write head and synchronized with the passing of the magnetic cells beneath the write head. This synchronization depends not only on the write pole speed but also on how quickly the trailing or front shield can close the flux circuit, establishing the write field gradient in the process.

SUMMARY

Actively synchronizing magnetic responses of a shield and a write pole is disclosed. A transducer head includes a write pole and a shield. The shield may be a front shield and/or side shield(s). A control circuit actively synchronizes magnetic responses of the shield and the write pole during operation, for example, to mitigate erasure and enhance performance in magnetic storage devices. Other implementations are also described and recited herein.

This Summary is provided to introduce a selection of concepts in a simplified form that are further described below in the Detailed Description. This Summary is not intended to identify key features or essential features of the claimed subject matter nor is it intended to be used to limit the scope of the claimed subject matter. Other features, details, utilities, and aspects of the claimed subject matter will be apparent from the following more particular written Detailed Description of various implementations and implementations as further illustrated in the accompanying drawings and defined in the appended claims.

BRIEF DESCRIPTIONS OF THE DRAWINGS

The described technology is understood from the following Detailed Description describing various implementations read in connection with the accompanying drawings.

FIG. 2a illustrates a simplified side view of an example transducer head, wherein a write pole and front shield are visible.

FIG. 2b illustrates a simplified air bearing surface (ABS) view of an example transducer head, wherein a write pole, front shield, and side shields are visible.

FIGS. 3a-d illustrate a simplified top-down view of an example transducer head showing a coil wire in different positions relative to the side shield.

FIGS. 4a-b illustrate a simplified side view of an example transducer head showing a coil wire in different positions relative to the front shield.

Figure 5:
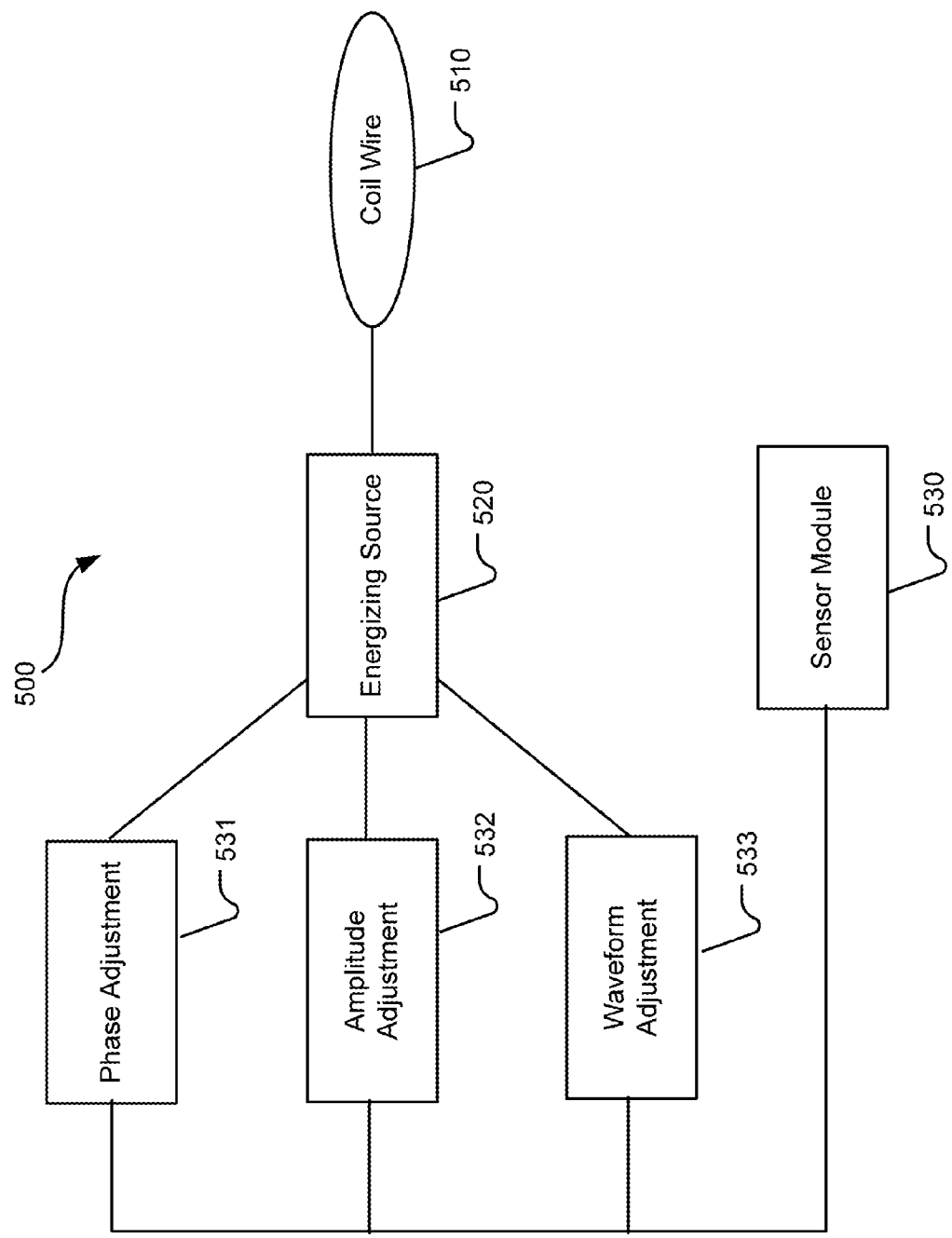

FIG. 5 illustrates a block diagram of an example control circuit which may be configured to actively synchronize a magnetic response of the shield and the write pole.

Figure 6:
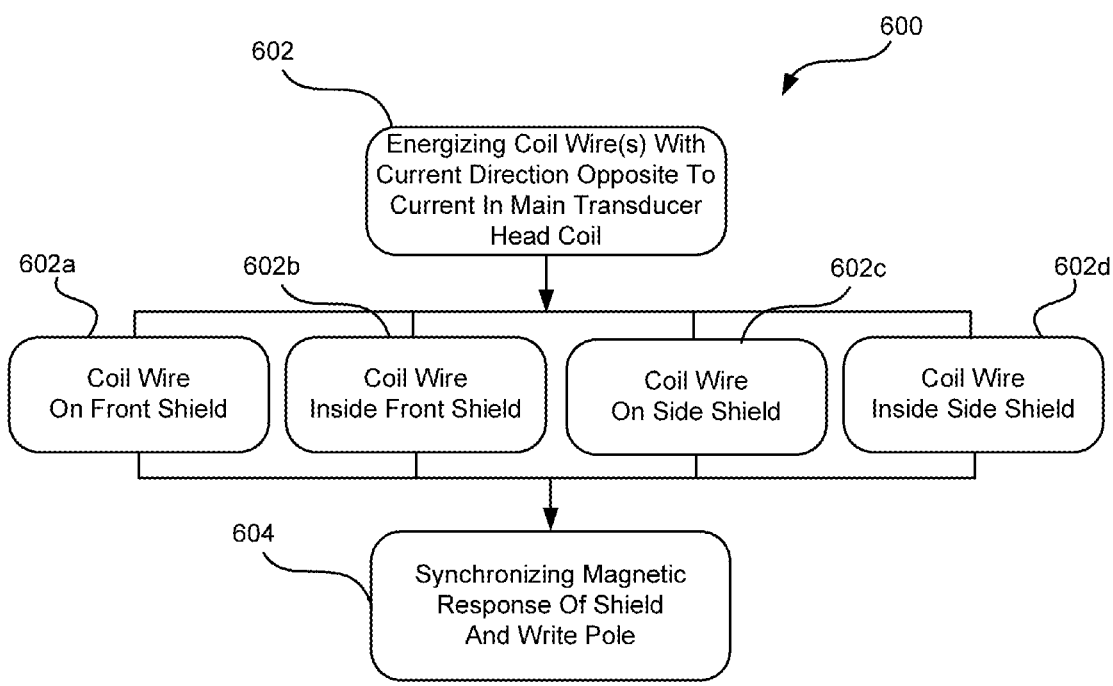

FIG. 6 illustrates a flow chart illustrating example operations for actively synchronizing a magnetic response of the shield and the write pole.

Figure 7:
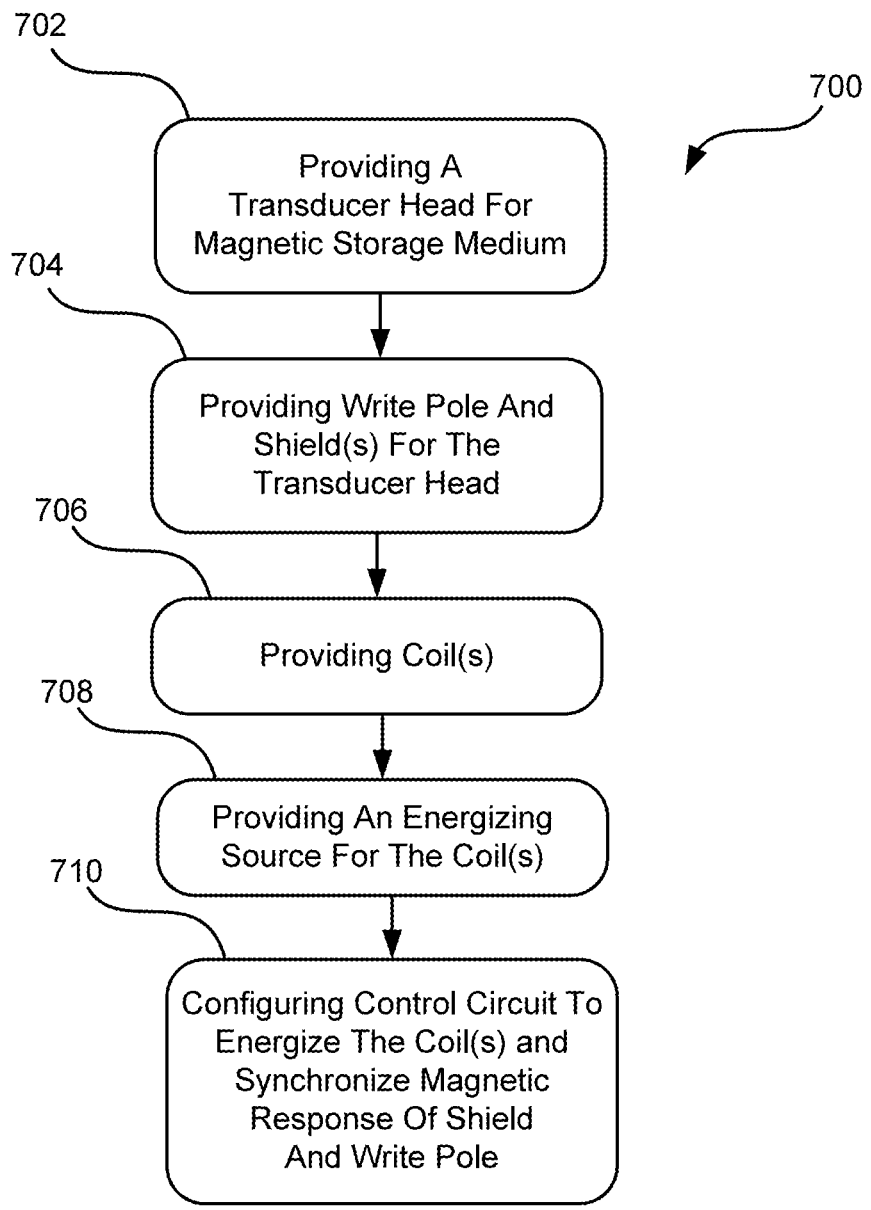

FIG. 7 illustrates a flow chart illustrating example operations for manufacturing a transducer head which may be used to actively synchronize a magnetic response of the shield and the write pole.

DETAILED DESCRIPTION

Magnetic data storage devices include media, wherein each data bit is magnetically stored on the media. Data is stored in the individual cells along consistent bit tracks, which are typically recorded into the storage medium at concentric radial positions (e.g., from an inner diameter (ID) to an outer diameter (OD) of the storage medium). As the storage medium rotates in a storage device, a transducer head is positioned in close proximity to the storage medium surface along a data track to read data from and write data to the individual cells in the track.

Disc drives typically use an actuator for positioning the transducer head adjacent to the storage medium. A servo control system receives servo positioning information read by the transducer head from the data tracks, typically from equally-angularly-spaced servo sectors that extend generally radially across the tracks. The servo control system supplies control signals to the actuator to maintain the transducer head on track and move the transducer head to the desired tracks for reading and writing of data.

Synchronizing the write pole establishing the flux circuit with the front shield closing the flux circuit enhances write accuracy, ensuring that a magnetic write field supplied will achieve a fast and sharp transition between two bits.

Figure 1:
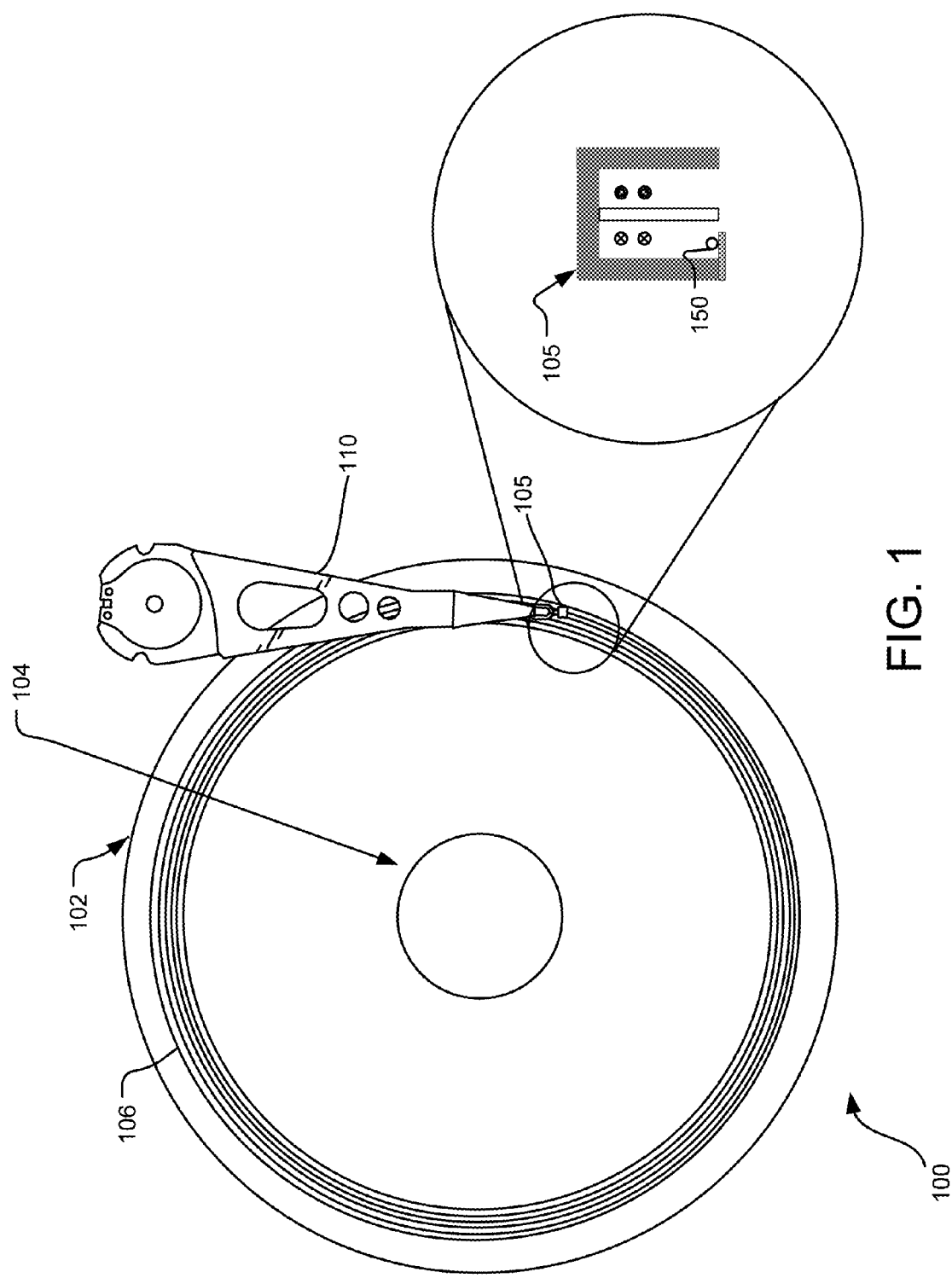
FIG. 1 illustrates a plan view of an example implementation of a magnetic storage disc with a transducer head situated on an end of an actuator assembly.

FIG. 1 illustrates a plan view of an example implementation of a disc 100 with a transducer head 105 situated on an end of an actuator assembly 110. Disc 100 includes an outer diameter 102 and inner diameter 104 between which are a number of concentric tracks 106, illustrated by circular dashed lines. Tracks 106 are substantially circular and are regularly spaced, indicated as ovals in the track 106 as illustrated on disc 100. The disc 100 rotates about a disc axis of rotation during operation.

Information is written to and read from the tracks on the disc 100 in different tracks 106. The transducer head 105 (as can also be seen in the exploded view in FIG. 1) is mounted on the actuator assembly 110 at an end distal to the actuator assembly 110 axis of rotation, and flies in close proximity above the surface of the disc 100 during disc operation. The actuator assembly 110 rotates during a seek operation about the actuator assembly 110 axis of rotation positioned adjacent to the disc 100. The seek operation positions the transducer head 105 over a target track.

In an implementation, to enhance transition sharpness and reduce side track erasure, the write pole and the front shield in the transducer head 105 are actively synchronized, e.g., using coil 150. An example write pole and front shields can be seen in the views of the transducer head shown in FIGS. 2a and 2b.

FIG. 2a illustrates a simplified side view 200 of an example transducer head 205 (e.g., the transducer head 105 in FIG. 1). The transducer head 205 is shown (with the actuator assembly omitted) including a write pole 210 and front shield 220. FIG. 2b illustrates a simplified air bearing surface (ABS) view 201 of the example transducer head 205 shown in FIG. 2a. The ABS view 201 shows the write pole 210 and front shield 220 as these appear from the ABS 202 "looking up" at the transducer head 200, e.g., in the direction of arrows 2-2. Side shields 230a and 230b can also be seen by the view shown in FIG. 2b.

The transducer head 205 is designed with a compact core. Compact cores demonstrate performance benefits in response to a reduced write field rise time (that is, how fast the writer pole responds to a change in direction of the coil field). Main transducer head coils 201a and 201b may be implemented close to the ABS 202 of the magnetic storage medium for the purpose of reducing the write field rise time. However, changing write field rise time does not affect gradient rise time (that is, how quickly the writer structure can achieve an ideal gradient). Write field is determined mostly by a write pole, but gradient depends on the response of the writer structure. The gradient rise time is typically much slower than the write field rise time, and depends not only on the write pole speed, but also on how fast the front shield(s) (e.g., front shield 220 and/or side shields 230*a* and 230*b*) can close the flux circuit to establish the write field gradient. Compact core designs demonstrate substantial risk of side track erasure (that is, writing to adjacent tracks).

An example approach utilizes an Ampere wire inserted into the write gap between the write pole and the front shield of the transducer head. The Ampere wire simultaneously energizes the write pole and the front shield. However, placement of such a wire in the write gap increases the size of the write gap, which is not compatible with establishing a good write field gradient. In addition, the size and placement of the Ampere wire can cause reliability issues. Although the location of the Ampere wire may be selected in order that the field produced by the Ampere wire directly enhances the write field and write field gradient, such enhancement appears to be insufficient when used in transducer heads having a small write gaps. In order to put the Ampere wire in the write gap, the distance between the write shield and the write pole would need to be increased, resulting in reduced gradients.

To assist in erasure mitigation and performance enhancement, and better coil design is disclosed. The coil design generates a magnetic field that is energized and field-amplified by a coil wire 250 positioned in the vicinity of the write pole 210 at the ABS. The coil wire 250 can generate large local magnetic fields by way of large current densities in a thin wire.

The field profile from the wire maps onto that of the write pole 210 to yield enhanced field gradients. The magnetic field is confined in the cross-track direction using magnetic shields and/or field cancellation using other magnetic fields generated at the transducer head 205.

In an example, the transducer head 205 includes coil wire(s) positioned adjacent and/or provided inside the front shield 220 and/or side shields 230*a* and 230*b*. In FIGS. 2*a* and 2*b*, the coil wire 250 is illustrated positioned on the front shield 220 in the transducer head 205. Such an implementation is shown only for purposes of illustration, and is not intended to be limiting. Placement of the coil wire 250 is discussed in more detail below with reference to several example implementations in FIGS. 3*a-d* and FIGS. 4*a-b*. Other placements of the coil wire 250 are also contemplated, as will be readily apparent to those having ordinary skill in the art after becoming familiar with the teachings herein.

It is noted that the one or more coil wire 250 may be used, each including one or more winding of the wire used to form the coil. The materials used to manufacture the coil wire may include any of a wide variety of conventional electrical conductors, including but not limited to metals such as Cu, Au, Al, W, and Mo. Other non-metal materials may also be used, such as carbon nanotubes. The material may also be selected to have a small coefficient of thermal expansion so that the size can be contained even when heat is generated by the current flowing through the coil wire 250.

The conductivities and materials used to manufacture the coil wire 250 may be engineered according to the desired result. For example, different substances can be used to generate the desired conductivity and current density to produce a strong magnetic field having a polarity opposite to that of the write pole 210. The materials and designs may also be selected to produce reduced side fields, good cross-track field confinement, and shielding from adjacent tracks.

The coil wire 250 is energized using a relatively small current flowing in the direction opposite to current flowing in the main transducer head coils 201*a* and 201*b*. This current generates a magnetic field to actively synchronize the response of the write pole 210 with the front shield 220 and/or side shield(s) 230*a* and 230*b* during write operations.

The current in the coil wire 250 can be similar to that provided to the main coil, or may be different (e.g., different waveform). Heat generated at high-current densities can be dissipated through the cooling power available at the ABS for a head in flight. This cooling power is already coupled with the transducer head due to the large surface area of the recording media relative to the transducer head 205.

The coil wire 250 is energized using any suitable source, including but not limited to a current source. In an example, the coil wire 250 is energized using the same current source that is used to energize the main transducer head coils 201*a* and 201*b*. In another example, current in the coil wire 250 can be driven independently of the main transducer head coils 201*a* and 201*b*. In such an implementation, the current source is used to establish a current in the coil wire 250 independent of the current being provided to the main transducer head coils 201*a* and 201*b*. Using an independent current source enables properties of the current (e.g., waveform, amplitude, and phase) to be "fine-tuned" for the coil wire 250, for example, based on operating conditions and a feedback loop discussed in more detail below with reference to the circuit diagram shown in FIG. 5.

The coil wire 250 is wound (with one or more turns) and includes at least one conductor. The coil wire 250 can be energized with a current from a current source. As discussed above, the coil wire is provided in any suitable position in the transducer head to achieve the desired result.

FIGS. 3*a-d* illustrate simplified top-down views 300*a-c*, of a portion of the transducer head (e.g., the example transducer head 205 shown in FIGS. 2*a* and 2*b*). These views show the coil wire 350*a-c* in various example positions relative to the write pole 310*a-c* and the side shield 330*a-c*, respectively. It is noted that although only one of the side shields 330*a-c* is shown in the views 300*a-c* in FIGS. 3*a-d*, the coil wire 350*a-c* is positioned on one or both of the side shields.

Figure 3B:
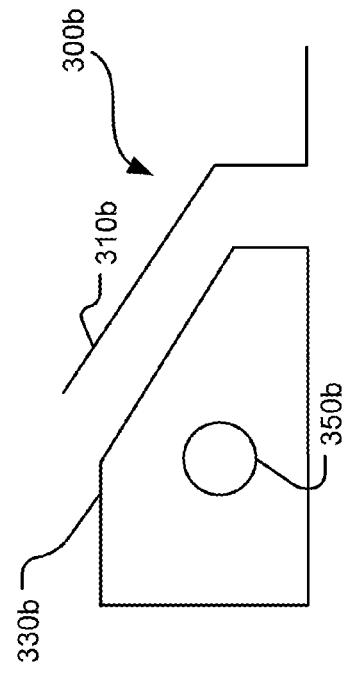
Figure 3D:
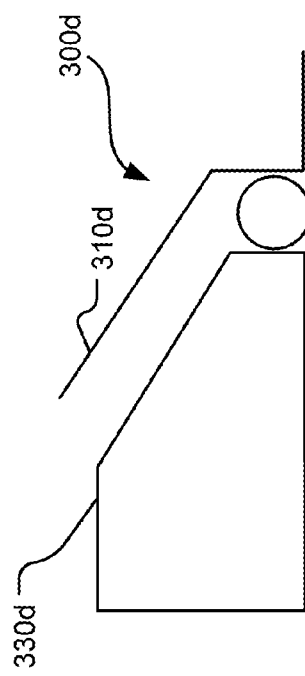
Figure 3A:
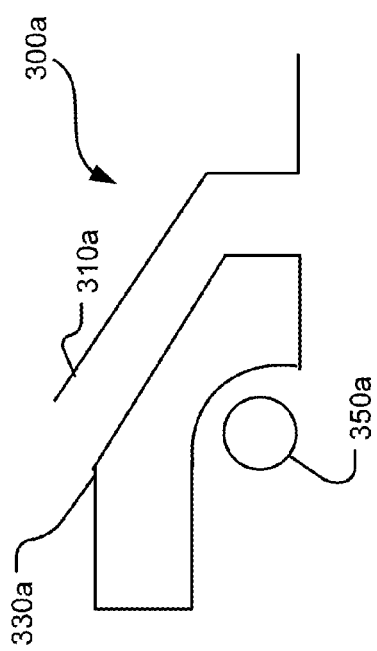
Figure 3C:
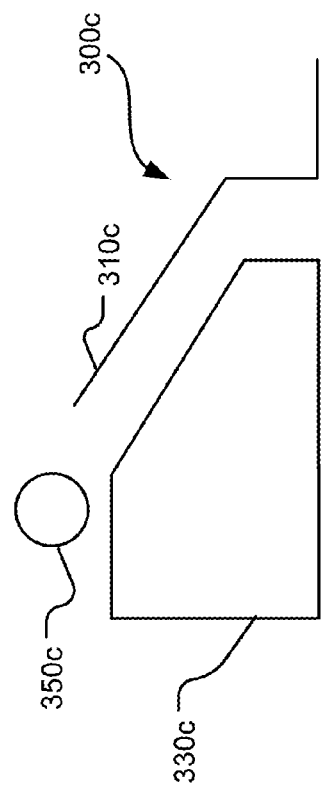

In FIG. 3*a*, the coil wire 350*a* is shown provided behind the side shield 330*a*, relative to the write pole 310*a*. In FIG. 3*b*, the coil wire 350*b* is shown provided inside or within the side shield 330*b*. In FIG. 3*c*, the coil wire 350*c* is shown provided on the side shield 330*c*, and exposed relative to the write pole 310*c*. In FIG. 3*d*, the coil wire 350*d* is shown provided between the side shield 330*d* the write pole 310*d*.

In each of the examples shown in FIGS. 3*a-d*, the coil wire 350*a-c* is positioned on the side shields 330*a-c* in a down track direction. This position enables the coil wire 350*a-c* to produce an electro-magnetic field which directly opposes flux leakage generated by the write pole 310*a-c* into the side shields 330*a-c*.

During investigation of side track erasure, it was observed that the side shields 330 have a faster response time than the write pole 310. The side shields 330 also have much larger dynamic permeability. Moreover, the wire 350 is closer to the side shields 330 than the main transducer head coil. Thus, only small Amperian fields produced by the wire 350 are required to quickly align the magnetization in the side shields in the direction opposite to the one in which the write pole begins to magnetize. As a result, the flux path from the write pole 310 returns to the soft-under-layer (SUL) and back into the side shields 330, instead of moving onto an erasure path, thereby reducing side erasure and enhancing the cross-track gradient.

FIGS. 4a-b illustrate a simplified side view of an example transducer head showing a coil in different positions relative to the front shield. In FIG. 4a, the coil wire 450a is shown provided adjacent (e.g., above or on top of) the front shield 420a, relative to the write pole 410a. In FIG. 4b, the coil wire 450b is shown provided inside or within the front shield 420b. In the examples shown in both FIGS. 4a-b, the coil wire 450 is oriented in a cross-track direction in proximity or embedded in the front shield, and recessed in a down track direction from the write pole.

In each of the examples illustrated in FIGS. 3a-d and 4a-b, current is applied in a direction opposite to that in the main transducer head coil. Such an implementation enables fast re-magnetization of the front shield in the direction opposite to the write pole and leads to enhanced gradient rise time and amplitude at the time of writing, and a reduction of the front shield saturation.

It is also noted that the magnetic coupling of the shields to the write pole and return pole can be tuned separately by adjusting properties of the coil wire (e.g., insulator thicknesses, conductor thickness, volume of magnetic material, and magnetic properties of the materials used), area at the interfaces between the coil wire and write pole, and the current supplied to the coil wire.

It is further noted that that shields can be made of any suitable materials, and may be manufactured to complement operation of the coil wire, e.g., with electrical and thermal properties that enhance and/or direct the magnetic field generated by the coil wire. For example, the shields may be designed to confine the magnetic field profile of the coil wire, as the soft magnetic material acts as both a return path for flux emanating from the head and as a magnetic shield (shielding the write pole from fields emanating from adjacent tracks). Examples of suitable magnetic materials include but are not limited to NiFe, CoFe, and a Cu/CoFe multi-layer structure.

In addition, a higher current density in the coil wire may be used to produce a strong side field with polarity opposite that of the write-pole. This effect, in combination with the soft magnetic material of the shields, results in reduced side effects, good cross-track field confinement, and shielding adjacent tracks. Because the shields also act as heat sinks for the coil wire, the magnetic material should have good thermal properties.

In another implementation, an additional wire is provided in the transducer head and used to provide additional field to impact magnetic state of the write pole to reduce erase after write like erasure. Thus for the same write field, the magnitude of the side shield erasure can be decreased significantly. It is also noted that the placement of the coil wire in the cross track direction, above the front shield, results in an enhancement in gradient rise time.

While the field generated from the additional wire mitigates erase after write (EAW), it also may have a negative impact on the performance of the write pole as the Amperian field from the coil wire is in an opposite direction to that caused by the main transducer head coil. Additional measures can be taken, however, to reduce or even cancel this impact. For example, a specific current waveform may be used to energize the coil wire prior to or briefly during the initial energizing of the main transducer head coil, but quickly turns off the coil wire when the main transducer head coil energizes. In another example, the coil wire can be clad with a magnetic material to prevent a direct flux leakage impacting the write pole. An example of cladding is embedding the wire in the front shield. In yet another example, the shape of the coil wire is manufactured in such a way that its geometry favors generation of a field in the front shield, but not in the write pole. An example shape exhibiting this property is a coil extended in the down track direction, but contracted in the direction perpendicular to the ABS, so that the coil wire forms a thin conducting plane that is parallel to the ABS.

FIG. 5 illustrates a block diagram of an example control circuit 500 configured to actively synchronize a magnetic response of a write pole and shield(s) in a transducer head. In an implementation, actively synchronizing a magnetic response of a write pole and shield is performed by circuitry located off of the transducer head to energize one or more coil wire 510. In another implementation, the circuitry is located on or within the transducer head. Combinations of off-head and on-head circuitry may also be employed.

In an example, the control circuit 500 includes an energizing source 520. The energizing source 520 may be a current generator that delivers a current to the coil wire(s) 510. As described above, the energizing source 520 may be the same current source that drives the main transducer head coils. The energizing source 520 may also be independent of the current source that drives the main transducer head coils. Such an example enables the energizing source 520 to deliver a current that is "fine-tuned" or adjusted for the coil wire 510 independent of the current being provided to the transducer head coils.

An independent energizing source may be implemented in a control circuit 500 including a sensor module 530. Sensor module 530 receives input from the coil wire 510 and/or the electro-magnetic field being generated by the coil wire 510. Sensor module 530 can also receive input from other sources.

Input received by the sensor module 530 is processed and used to make adjustments to the output of the energizing source 520. For example, the input at sensor module 530 may be used for phase adjustment 531, amplitude adjustment 532, and/or waveform 533 of the current signal, to name only a few examples of adjustments which can be made to the output of the energizing source 520.

FIG. 6 illustrates a flow chart illustrating example operations 600 for actively synchronizing a magnetic response of the shield and the write pole. Exemplary operations 600 may be implemented in circuitry and/or encoded as logic.

In an energizing operation 602, coil wire(s) are energized with current flowing in a direction opposite the current flowing in the main transducer head coil. In an implementation, a coil on a front shield is energized 602a, and/or a coil inside the front shield is energized 602b. In another implementation, a coil on a side shield(s) is energized 602c, and/or a coil inside the side shield(s) is energized 602d. It should be understood that the current (e.g., direction, waveform and/or amplitude) can be varied. In a synchronizing operation 604, a magnetic response of a shield and a write pole are synchronized. In another implementation, a combination of both the side shield and front shield can be energized.

FIG. 7 illustrates a flow chart illustrating example operations 700 for manufacturing a transducer head which may be used to actively synchronize a magnetic response of the shield and the write pole.

In an assembly operation 702, a transducer head is provided for a magnetic storage medium. In another assembly operation 704, a write pole and a shield are provided for the transducer head. In another assembly operation 706, a coil is provided. The coil may be provided adjacent the shield. In another implementation, the coil is provided inside the shield.

The shield may be a front shield and/or side shield(s). In another assembly operation 708, an energizing source is provided for the coil(s).

In a configuration operation 710, a control circuit is configured to actively synchronize a magnetic response of the shield and the write pole during operation. In an implementation, the control circuit is configured to energize at least one coil during operation.

Implementations described above for actively synchronizing a magnetic response of a shield and a write pole provide high-efficiency write operations, e.g., using a thin-film coil wire operatively associated with an inductive write head at the ABS. The high flux density from the coil wire magnetizes the write pole. The field profile from the coil wire maps onto that of the write pole to yield enhanced field gradients that exceed the capability of current technology, and the design can be readily fabricated and manufactured using common, low complexity materials and processing techniques.

While the exemplary implementations herein are applied to magnetic media, it should be understood that they are also applicable to other types of media, such as patterned media, and their respective methods of recording.

The above specification, examples and data provide a complete description of the structures of exemplary implementations of methods and apparatus that may be used to synchronize a magnetic response of a write pole and shield. Although various implementations of the apparatus have been described above with a certain degree of particularity, or with reference to one or more individual implementations, those skilled in the art could make numerous alterations to the disclosed implementations without departing from the spirit or scope of this invention. It is intended that all matter contained in the above description and shown in the accompanying drawings shall be interpreted as illustrative only of particular implementations and not limiting. Changes in detail or structure may be made without departing from the basic elements of the invention as defined in the following claims.

What is claimed is:

1. A method of manufacturing a transducer head, the method comprising:
   configuring a control circuit to actively synchronize magnetic responses of a shield and a write pole during operation; and
   configuring the control circuit to energize at least one coil wire during operation with a current direction opposite to current flow in a main transducer head coil.

2. The method of claim 1 further comprising:
   providing a coil wire adjacent the shield.

3. The method of claim 1 further comprising:
   providing a coil wire inside the shield.

4. A method comprising:
   actively synchronizing a magnetic response of a shield to a magnetic response of a write pole by adjusting a parameter of a current signal energizing at least one coil wire.

5. The method of claim 4 further comprising energizing the shield.

6. The method of claim 4 further comprising:
   energizing the at least one coil wire with a current direction opposite to current flow in a main transducer head coil.

7. The method of claim 4 wherein the at least one coil wire is on a front shield.

8. The method of claim 4 wherein the at least one coil wire is inside a front shield.

9. The method of claim 4 wherein the at least one coil wire is on a side shield.

10. The method of claim 4 wherein the at least one coil wire is inside a side shield.

11. A transducer head comprising:
    a write pole and a shield; and
    a control circuit to actively synchronize magnetic responses of the shield and the write pole.

12. The transducer head of claim 11 wherein the shield is a front shield.

13. The transducer head of claim 11 wherein the shield is a side shield.

14. The transducer head of claim 11 wherein the control circuit is configured to energize at least one coil wire.

15. The transducer head of claim 14 wherein the control circuit is configured to energize the at least one coil wire with a current direction opposite to current flow in a main transducer head coil.

16. The transducer head of claim 14 wherein the coil wire is adjacent the shield.

17. The transducer head of claim 14 wherein the coil wire is inside the shield.

18. The transducer head of claim 11 wherein the control circuit is configured to increase density of magnetic cells on a recording medium to mitigate erasure and enhance performance.

19. The transducer head of claim 11 wherein the control circuit is configured to increase density of magnetic cells along a track on a recording medium.

20. The transducer head of claim 11 wherein the control circuit is configured to increase density of magnetic cells between adjacent tracks on a recording medium.

* * * * *